Nov. 1, 1938.  E. W. SCHUMACHER  2,135,262
OPTICAL MEANS FOR INCREASING REAR VISION
Filed Feb. 10, 1936  2 Sheets-Sheet 1
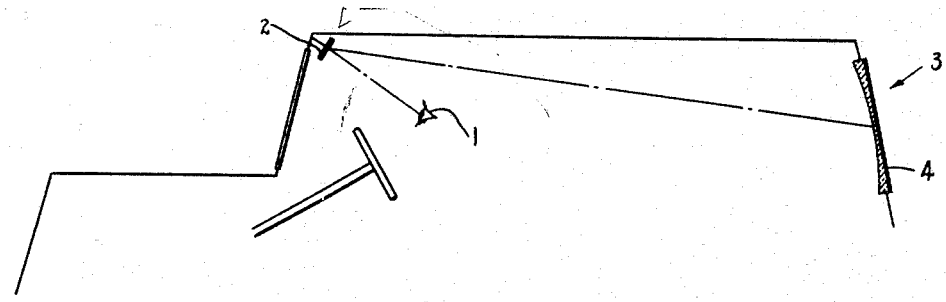
FIG. I
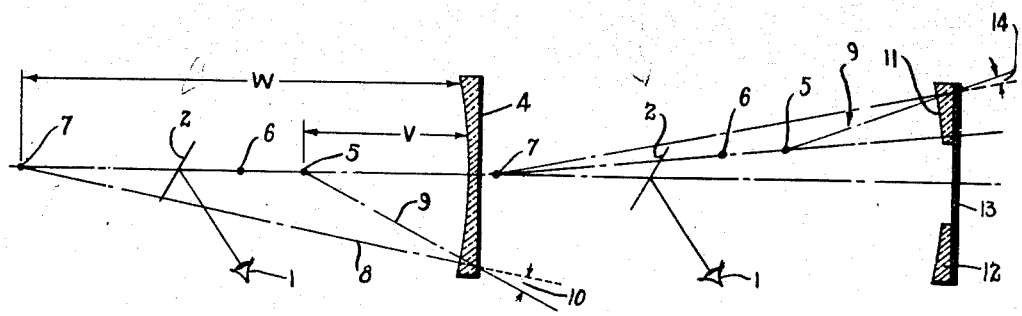
FIG. II  FIG. III
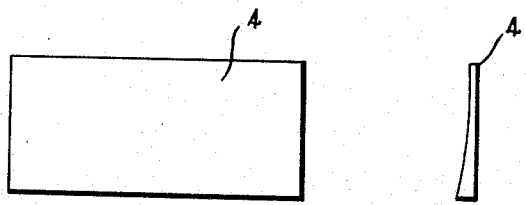
FIG. IV  FIG. V
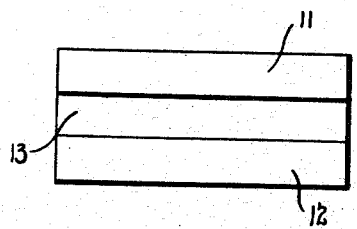
FIG. VI  FIG. VII
INVENTOR
ELMER WELDON SCHUMACHER
BY
Harry H. Styll
ATTORNEY

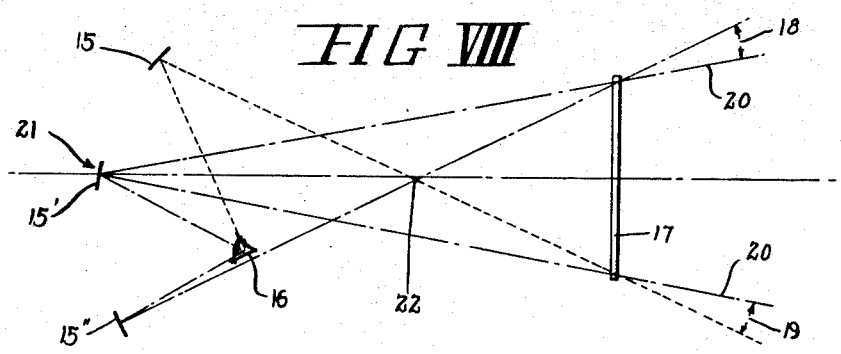
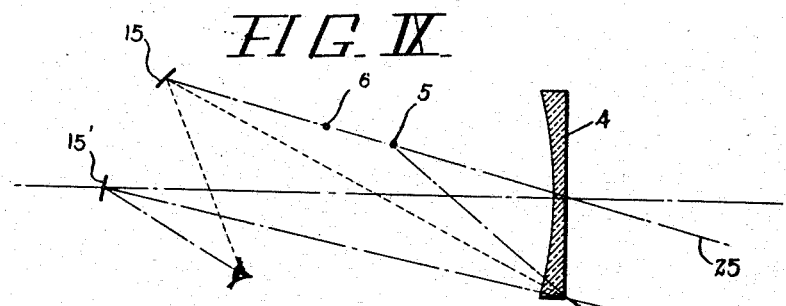
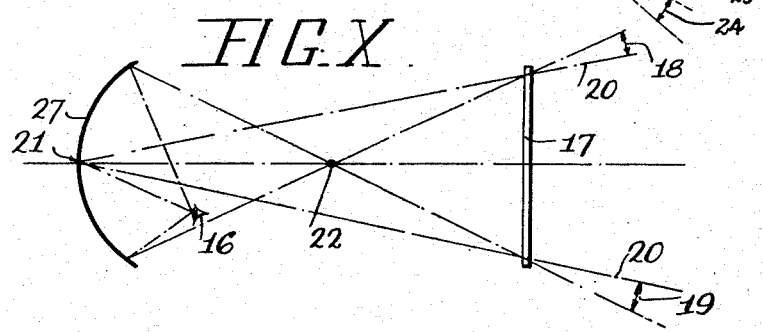

Patented Nov. 1, 1938

2,135,262

UNITED STATES PATENT OFFICE 2,135,262

OPTICAL MEANS FOR INCREASING REAR VISION

Elmer Weldon Schumacher, Southbridge, Mass.

Application February 10, 1936, Serial No. 63,165

3 Claims. (Cl. 88—93)

This invention relates to improvements in optical systems for increasing rear vision in vehicles and other devices requiring such increased vision.

A principal object of the invention is to provide optical means to increase rear vision in a vehicle or other object requiring such vision.

Another object of the invention is to provide simple, efficient, and inexpensive means for obtaining rear vision in vehicular objects and other devices requiring such vision.

Other objects and advantages of the invention will become apparent from the following description taken in connection with the accompanying drawings. It will be apparent that changes may be made in the details of construction and arrangement of parts without departing from the spirit of the accompanying claims; hence, it is not desired to limit the invention to the exact details, and arrangements shown and described, as the preferred forms only are given by way of illustration.

Referring to the drawings:

Fig. I is a diagrammatic sectional elevation of the invention as applied to an automobile;

Fig. II is a diagrammatic plan view illustrating the function of the rear negative lens portion of the device embodying the invention;

Fig. III is a diagrammatic plan view of the modified form of rear negative lens and illustrating its function;

Fig. IV is a plan view of another modified form of rear negative lens;

Fig. V is an end view of Fig. IV.

Fig. VI is a plan view of a window and split rear negative lens used in a modified form of the device;

Fig. VII is an end view of Fig. VI;

Fig. VIII is a diagrammatic plan view of another part of the invention looking in a downward direction as if the top of the vehicle had been removed;

Fig. IX is a view similar to Fig. VIII showing the device of Fig. II combined with that of Fig. VIII;

Fig. X is a view generally similar to Fig. VIII of a further modified form of reflective means.

It is well known that while most automobiles have rear windows the vision through same is so restricted in backing up that the driver cannot see objects close up in his path while backing. It is, therefore, a principal object of this invention to so optically increase the field of vision that such objects may be seen and the operation of backing facilitated and made safe.

Referring to the drawings, wherein like reference characters denote like parts throughout, Fig. I shows in outline the transverse elevation of an automobile. The eye of the driver is assumed to be located at 1. The eye 1 is aligned with a mirror 2 so angled as to reflect to the eye 1 the image of the rear window 3 and objects seen therethrough.

Ordinarily, with a plane glass window at 3, objects fairly close to the automobile in the rear cannot be seen in the mirror 2 by the eye 1. In the device of the invention mirror means 2, optically equivalent to a concave reflector is located in front of the eye 1, and so angled as to image the window 3 and the plane glass window 3 is replaced by a negative lens 4, which negative lens will widen the field of view through the window 3 as imaged on the mirror 2, as hereinafter described, and thus enable the driver to see on the mirror objects in the rear close up to the rear of the car, by which he may be guided when backing up. The concave reflector also widens the field of vision as will be hereinafter described.

Referring to Fig. II, wherein the function of the negative lens 4 is illustrated, the eye is assumed to be located at 1 and vision is directed at the mirror 2, angled to image the negative lens 4.

The image of the eye as formed by the lens 4 will be located at 5. The focus of lens 4 is at 6. The point 7 is the equivalent point of the image of the eye by the mirror 2, or the effective point of the eye 1. The line 8 represents an extreme line of vision at the edge of the lens 4. The line 9 from the point 5 through the point where the line 8 intersects the lens 4 on the rear surface represents the increased angle of vision through the lens 4 indicated by the angle 10.

The optical formula involved here is $$\frac{1}{W}+\frac{1}{V}=\frac{1}{f}$$

Where W denotes the distance of the eye from the lens 4, V denotes the distance of the image of the eye from the lens 4, and $f$ denotes the focus of the lens 4.

Let us assume W equals 80 and $f$ equals minus 40; then we have $$\frac{1}{80}+\frac{1}{V}=\frac{-1}{40} \text{ or, } V \text{ equals } \frac{80}{3}$$

or −27 inches (about).

In Fig. III, which is a modification, the lens 4 is replaced by a split negative lens, having the parts 11 and 12 spaced apart and held on the rear window 13. In this modification the increased vision is represented by the angle 14, the optical properties and formula being otherwise the same as for Fig. II. In this modification the objects will be seen through the window 13 between the edges of the lens parts 11 and 12 as of normal size, and through the lens parts as of reduced size.

The whole window 3 may be made of a single negative lens 4, as shown in Fig. II, or part negative lenses may be secured on the rear window 13, as shown in Fig. III. The parts 11 and 12 may be cemented on the window 13 by Canada balsam or other adhesive, or they may be otherwise held in place by any suitable mounting, either on the window 13 or in line therewith, as desired.

The lenses 4, 11, and 12 may be either spherical or cylindrical, as desired. The lens may be designed only to direct the image downward, as shown in Figs. IV and V, or it may be made to direct the image sidewise at either end, as desired. This may be accomplished by making the lens in the form of a prism and by positioning the base of the prism in the direction of desired increased vision. The same thing may be done with the lenses 11 and 12, as shown in Figs. VI and VII, that is, the lens sections may be arranged top and bottom as shown, or at either side, as desired.

Instead of negative lenses at the rear window, prisms may be used to direct the image in any direction required or double mirrors may be substituted for the same purpose.

In Fig. VIII the characteristics and function of one of the mirror means of the invention is shown. The mirror means in this instance is illustrated as being formed of a plurality of spaced mirror sections 15, 15' or 15'', and in Fig. X as being a concave cylindrical mirror 27. The concave mirror or spaced sections 15, 15' or 15'' may be used instead of the single plane mirror 2 illustrated in Fig. I. This cylindrical mirror may be a section of a cylinder, a true cylinder, or a plurality of plane mirrors approximating the position of and tangent to the curvature of the curved mirror. These mirrors are so located relative to the eye 16 of the observer, and to the window 17 of the vehicle, as to increase the angle of vision through said window by the amounts indicated at 18 and 19. The increase in the angle of vision may be confined to only the opposed sides of the vehicle, as indicated at 18 and 19, but may also be in an upwardly and downwardly direction. The window 17 in this instance is of the prior art plane plate glass type.

The mirrors or sections of mirrors 15, 15' or 15'' are located as shown diagrammatically in Figs. VIII and X, at such positions as to obtain the greatest possible increase in angle of vision through the rear window 17.

It will be noted that the section 15'' or one portion of the concaved mirror 27'', as shown in Fig. X, is positioned to the left of the body portion of the vehicle and to the left of the observer, who may be seated in the front of the vehicle, and that the section 15 or another portion of the concaved mirror 27'' is positioned to the right of the body portion and to the right of the observer. The reflecting means 15 or corresponding portion of the concaved mirror 27'' will, therefore, provide increased vision at the left of the body portion, and the reflecting means 15'' or corresponding portion of the concaved mirror 27'' will provide increased vision at the right of the body portion, the angles of vision crossing each other between the front and rear of the body portion, and the point of intersection being substantially the effective position of the eye of the observer. This point of intersection is illustrated at 22 in Figs. VIII and X.

In these diagrammatic illustrations the lines 20 indicate the prior art angle of vision as obtained by a mirror similar to that illustrated at 2 in Fig. I, and located as at 21 in Fig. VIII.

The use of a concave mirror or plurality of sections 15, 15' or 15'', produces an effect similar to locating the eye of the observer somewhere between the rear window 17 and the front of the car at a position substantially approximating that indicated at 22 in Fig. X. Optically this places the eye of the observer nearer the rear window 17, whereby the view through the rear window is correspondingly increased by the amounts indicated at 18 and 19.

In Fig. IX there is shown the combination of the mirrors 15, 15', etc., of Fig. VIII, and the concaved window 4 of Fig. II. This increases the angle of vision by the amounts indicated at 23 and 24, one increase in angle being brought about by the principle set forth in connection with Fig. VIII, and the other by the principle set forth in connection with Fig. II. The combining of these two principles, as set forth in Fig. IX, will thereby greatly increase the angle of vision through the rear window 17.

It is apparent that although Fix. IX only illustrates the use of the window 4, windows of the type shown in Figs. V and VII may also be used, in combination with the arrangement shown in Fig. VIII, to bring about a further increase in the angle of vision.

It is apparent, therefore, that if only an increase in vision of the amount illustrated at 18 or 19 in Fig. VIII, is desired, the principles illustrated in said figures might be used; but if it is desired to obtain a further increase in the angle of vision, a combination of the principles illustrated in Fig. II and Fig. VIII may be used. This combination, and the consequent increase in the angle of vision, is shown diagrammatically in Fig. IX.

The image of the eye, as formed by the lens 4 in the arrangement shown in Fig. IX, will be effectively located at 5. The focus of the lens 4 will be approximately at the point 6. It will be noted that the points 5 and 6 are illustrated as lying on a line 25, which line in this instance designates the angle of reflection of the mirror 15. By effectively locating the eye of the observer at the point 5 on line 25, an increase in the angle of the field of vision through the window 4 by the amount illustrated at 24 will be obtained.

While this invention is particularly applicable to automobiles, it is very evident that it may be used in many other devices where similar conditions obtain, and the object is generally the same.

From the foregoing it will be seen that I have provided simple, efficient, and inexpensive means for obtaining all the objects and advantages of the invention.

Having described my invention, I claim:

1. In a device of the character described for use in combination with a vehicle body having a rear window, reflective means optically equivalent to a concaved cylinder reflector positioned in the front of the body and so disposed relative to said body and rear window as to reflect light received through said rear window to a point of observation within and near the front of said body, said reflective means having spaced reflective points all lying on the line of a section of a circle having its concaved side toward the rear window with the radius of curvature of said circle greater than the distance of said observation point from said reflective means, the said reflective means being so disposed relative to each other and to said body and rear window as to receive light rays passing through said rear window at angles which intersect each other at a point intermediate said rear window and front of the vehicle and reflect the said light rays to said point of observation.

2. In a device of the character described for use in combination with a vehicle body having a rear window, concaved reflective means positioned in the front of the body and so disposed relative to said vehicle body and rear window as to reflect light received through said rear window to a point of observation within the body, the concaved side of said reflective means being directed toward the rear window and the radius of curvature of said concaved side being greater than the distance of the observation point from said reflective means, said reflective means having reflective points so disposed relative to each other and to said body and window as to receive light rays passing through said rear window at angles which intersect each other at a point intermediate said rear window and front of the vehicle and reflect the said light rays to said point of observation.

3. In a device of the character described for use in combination with a vehicle body having a rear window, concaved reflective means positioned in the front of the body and so disposed relative to said vehicle body and rear window as to reflect light received through said rear window to a point of observation within the body, the concaved side of said reflective means being directed toward the rear window and the radius of curvature of said concaved side being greater than the distance of the observation point from said reflective means, said reflective means having reflective points so disposed relative to each other and to said body and window as to receive light rays passing through said rear window at angles which intersect each other at a point intermediate said rear window and front of the vehicle and reflect the said light rays to said point of observation, said rear window comprising optical means having optical characteristics which will further widen the angle of vision through the window as imaged on the reflective means.

ELMER WELDON SCHUMACHER.